United States Patent Office 2,707,711
Patented May 3, 1955

2,707,711

3-KETO-21-HYDROXY-4,9(11),17(20)-PREGNATRIENE AND ESTERS THEREOF

John A. Hogg, Kalamazoo Township, Kalamazoo County, Philip F. Beal III, Portage Township, Kalamazoo County, and Frank H. Lincoln, Jr., Kalamazoo Township, Kalamazoo County, Mich., assignors to The Upjohn Company, Kalamazoo, Mich., a corporation of Michigan No Drawing. Application September 2, 1953, Serial No. 378,182

7 Claims. (Cl. 260—397.45)

The present invention relates to steroid compounds, and is more particularly concerned with the novel 21-oxygenated steroids, 3-keto-21-hydroxy-4,9(11),17(20)-pregnatriene and 21-acylates thereof.

This application is a continuation-in-part of our copending applications Serial Number 307,385, filed August 30, 1952, and Serial Number 345,677, filed March 30, 1953.

The novel compounds of the present invention may be represented by the formula:

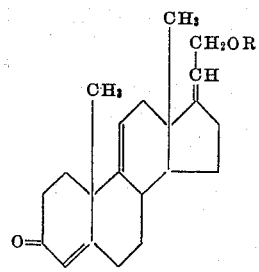

wherein OR is selected from the group consisting of hydroxy and acyloxy of the formula AcO, Ac being the acyl radical of a hydrocarbon carboxylic acid, especially such acids containing from one to eight carbon atoms, inclusive.

It is an object of the present invention to provide 3 - keto - 21 - hydroxy - 4,9(11),17(20) - pregnatriene and 21-acylates thereof, compounds which are useful and interesting intermediates in the synthesis of other steroid compounds, and, if desired, can be converted to physiologically active compounds. For example, 3-keto-21-hydroxy - 4,9(11),17(20) - pregnatriene - 21 - acetate on treatment with osmium tetroxide and hydrogen peroxide produces 3,20 - diketo - 17α,21 - dihydroxy - 4,9(11)-pregnadiene 21-acetate, which on bromination and oxidation with N-bromoacetamide and perchloric acid gives 9α - bromo - 17α - hydroxy - corticosterone 21 - acetate, from which cortisone acetate is obtained by further oxidation with chromic acid followed by debromination with zinc. Other objects and uses of the present invention will be apparent to one skilled in the art to which this invention pertains.

The novel 3 - keto - 21 - hydroxy - 4,9(11),17(20)-pregnatriene is prepared by dehydration of 3-keto-11β,21-dihydroxy-4,17(20)-pregnadiene, by concomitant hydrolysis and dehydration of a 3-keto-11β,21-dihydroxy-5,17(20)-pregnadiene 3-ketal, or by concomitant hydrolysis and dehydration of a 3-keto-11β,21-dihydroxy-5,17(20)-pregnadiene 3-ketal 11-bimetallic-hydride-complex such as that obtained by reduction of a 3-ketal of 3,11-diketo-5,17(20)-pregnadiene-21-oid acid 21-ester with lithium aluminum hydride. The nature of the 3-ketal group or 21-ester group, if present in the starting steroid, is not critical. According to the process of the present invention, the starting steroid, dissolved in a water-immiscible organic solvent to provide a water-immiscible phase of a liquid-liquid two-phase system, is reacted with a water-miscible strong acid, dissolved in an aqueous solvent to provide the aqueous phase of the liquid-liquid two-phase system, by mixing the two phases at a temperature below about 200 degrees centigrade. After completion of the reaction, the 3-keto-21-hydroxy-4,9(11),17(20)-pregnatriene product can be isolated from the reaction mixture, for example, by evaporating the solvents from the separated organic phase. The crude product can be purified, if desired, by recrystallization, chromatographic adsorption methods, etc. The 21-acylates of 3-keto-21-hydroxy-4,9(11),17(20)-pregnatriene can be prepared by esterification of the parent hydroxy steroid with an acylating agent such as, for example, an acid, acid anhydride, acid halide, ester of an acid with a lower alcohol, ketene, etc., as more fully described in Examples 2 through 6.

The following examples are illustrative of the products and processes of the present invention, but are not to be construed as limiting.

*Example 1.—3 - keto - 21 - hydroxy - 4,9(11),17(20)-pregnatriene and its 21-acylates*

The methyl ester of 3,11-diketo-4,17(20)-pregnadien-21-oic acid 3-ethylene-glycol ketal (1.03 grams) is dissolved in 25 milliliters of benzene, and absolute ethyl ether (35 milliliters) is added. The resulting solution is added dropwise, with stirring, to one gram of lithium aluminum hydride in fifty milliliters of absolute ethyl ether. After the addition is complete, the resulting mixture is heated under reflux for about one hour. Fifty milliliters of a solution containing 25 milliliters of concentrated hydrochloric acid and 25 milliliters of water is then added dropwise, the stirring being continued. The heterogeneous mixture is then heated under reflux for one hour with vigorous stirring. After cooling, the organic layer is separated, the water layer extracted several times with ether, and the organic layer and ether extracts combined. The ether and sufficient benzene to dry the remaining solution is then distilled. The dry benzene solution is chromatographed on a synthetic magnesium silicate (Florisil) column, ten percent acetone in normal-hexane (Skellysolve B) being used for elution. The 3 - keto - 21 - hydroxy - 4,9(11),17(20) - pregnatriene obtained weighs 0.633 gram. An analytically pure sample, obtained by recrystallization from acetone, melted at 142 to 143 degrees centigrade; $[\alpha]_D^{23}$ plus 154 degrees centigrade (in acetone).

*Analysis.*—Calculated for $C_{21}H_{28}O_2$: C, 80.73; H, 9.02. Found: C, 80.90; H, 9.08.

*Example 2.—3 - keto - 21 - hydroxy - 4,9(11),17(20)-pregnatriene 21-acetate*

3 - keto - 21 - hydroxy - 4,9(11),17(20) - pregnatriene 21-acetate is obtained by treating 3-keto-21-hydroxy-4,9(11),17(20)-pregnatriene with acetic anhydride in the presence of pyridine using the general esterification procedure of Shriner and Fuson ["The Systematic Identification of Organic Compounds," John Wiley and Sons, Inc., New York, Third edition, 1948, page 165]. The structure of the product was confirmed by infra-red light absorption analysis; melting point 107 to 108 degrees centigrade.

*Example 3.—3 - keto - 21 - hydroxy - 4,9(11),17(20)-pregnatriene 21-benzoate*

The 21 - benzoate of 3 - keto - 21 - hydroxy-4,9(11),17(20)-pregnatriene is obtained by treating the 21-hydroxysteroid with benzoyl chloride and pyridine following the esterification procedure of Shriner and Fuson ["The Systematic Identification of Organic Com-

*Example 4.—3 - keto - 21 - hydroxy - 4,9(11),17(20)-pregnatriene 21-propionate*

Following the procedure of Example 2, the 21-propionate of 3-keto-21-hydroxy-4,9(11),17(20)-pregnatriene is prepared by reaction of propionic anhydride with 3-keto-21-hydroxy-4,9(11),17(20)-pregnatriene.

*Example 5.—3 - keto - 21 - hydroxy - 4,9(11),17(20)-pregnatriene 21-(β-cyclopentylpropionate)*

The 21-(β-cyclopentylpropionate) of 3-keto-21-hydroxy-4,9(11),17(20)-pregnatriene is obtained by reaction of the free 21-hydroxy compound with β-cyclopentylpropionyl chloride, according to the procedure of Example 3.

*Example 6.—3 keto - 21 - hydroxy - 4,9(11),17(20)-pregnatriene 21-phenylacetate*

Following the method of Example 3, reaction of phenylacetyl chloride with 3-keto-21-hydroxy-4,9(11), 17(20)-pregnatriene is productive of 3-keto-21-hydroxy-4,9(11),17(20)-pregnatriene 21-phenylacetate.

In the same manner as shown in Examples 2 through 6, other 21-acylates of 3-keto-21-hydroxy-4,9(11),17(20)-pregnatriene are prepared by esterification using an appropriate acylating agent, including other 21-alkanoates as the 21-formate, butyrate, isobutyrate, valerate, hexanoate, heptanoate, octanoate, trimethylacetate, etc., 21-cycloalkylalkanoates as the 21-cyclohexylacetate, α-cyclopentylpropionate, cyclopentylacetate, etc., and other 21-acylates as the 21-acrylate, succinate, furylacrylate, etc.

It is to be understood that the invention is not to be limited to the exact details of operation or exact compounds shown and described, as obvious modifications and equivalents will be apparent to one skilled in the art, and the invention is therefore limited only by the scope of the appended claims.

We claim:

1. A 3 - keto - 21 - oxygenated - 4,9(11),17(20)-pregnatriene of the formula:

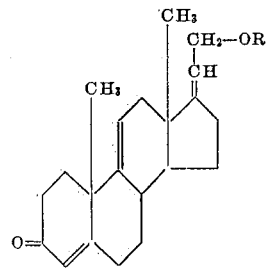

wherein OR is selected from the group consisting of hydroxy and acyloxy of the formula AcO, Ac being the acyl radical of a hydrocarbon carboxylic acid containing from one to eight carbon atoms, inclusive.

2. 3 - keto - 21 - hydroxy - 4,9(11),17(20)-pregnatriene.

3. A 3 - keto - 21 - hydroxy - 4,9(11),17(20)-pregnatriene 21-acylate wherein the acylate radical is of the formula AcO, Ac being the acyl radical of a hydrocarbon carboxylic acid containing from one to eight carbon atoms, inclusive.

4. 3 - keto - 21 - hydroxy - 4,9(11),17(20) - pregnatriene 21-acetate.

5. 3 - keto - 21 - hydroxy - 4,9(11),17(20) - pregnatriene 21-propionate.

6. 3 - keto - 21 - hydroxy - 4,9(11),17(20) - pregnatriene 21-(β-cyclopentylpropionate).

7. 3 - keto - 21 - hydroxy - 4,9(11),17(20) - pregnatriene 21-phenylacetate.

No references cited.